United States Patent [19]

Okano et al.

[11] Patent Number: 5,083,801
[45] Date of Patent: Jan. 28, 1992

[54] STEEL LAMINATE GASKET WITH DOWEL ENGAGING DEVICE

[75] Inventors: Takashi Okano, West Bloomfield; Fred Carr, III, Plymouth, both of Mich.

[73] Assignee: Ishikawa Gasket Co., Ltd., Tokyo, Japan

[21] Appl. No.: 656,520

[22] Filed: Feb. 19, 1991

[51] Int. Cl.⁵ ............................................. F16J 15/08
[52] U.S. Cl. ................................... 277/11; 277/235 B
[58] Field of Search .................. 277/9, 9.5, 11, 234, 277/235 B, 236

[56] References Cited

U.S. PATENT DOCUMENTS

| | | | |
|---|---|---|---|
| Re. 24,065 | 10/1955 | Bergstrom | 277/11 |
| 949,658 | 2/1910 | Randall | 277/11 |
| 1,589,171 | 6/1926 | Bailey | 277/11 |
| 4,524,979 | 6/1985 | Bauder | 277/235 B X |
| 4,529,212 | 7/1985 | Beckman | 277/212 F X |
| 4,776,601 | 10/1988 | Yamada | 277/234 X |
| 4,784,396 | 11/1988 | Scott et al. | 277/235 B |
| 4,819,954 | 4/1989 | Fucci et al. | 277/235 B |

FOREIGN PATENT DOCUMENTS 3610541 10/1987 Fed. Rep. of Germany ... 277/235 B

Primary Examiner—Thomas B. Will
Assistant Examiner—Scott W. Cummings
Attorney, Agent, or Firm—Kanesaka and Takeuchi

[57] ABSTRACT

The steel laminate gasket is installed between two engine parts. One of the engine parts is provided with at least two positioning pins for setting a location of the gasket. The gasket comprises at least first and second plates. The first plate includes at least first and second holes formed at portions corresponding to the positioning pins, and at least one flap surrounded by slits. The flap is formed adjacent to the first hole to slightly project thereinto. The second plate is situated above the first plate and is connected thereto. The second plate includes third and fourth holes corresponding to the first and second holes, and at least one notch located adjacent the third hole above the flap. When the gasket is pushed over the positioning pins, the flap bends and engages the positioning pin to securely connect the gasket to the engine block.

4 Claims, 1 Drawing Sheet

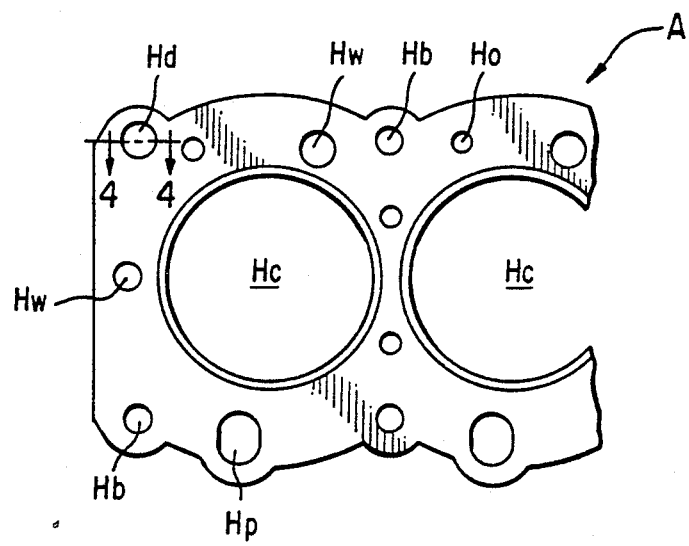
FIG. 1
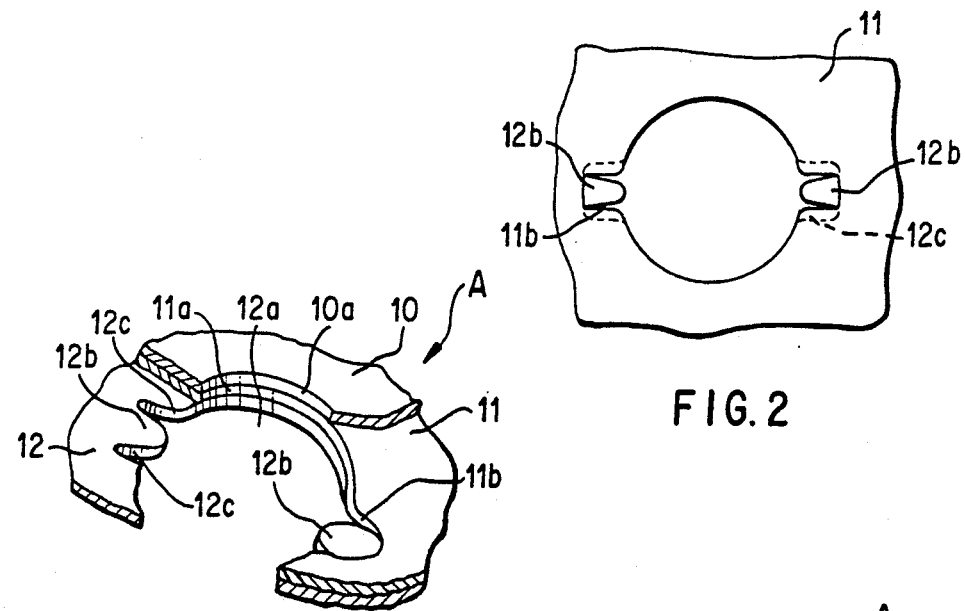
FIG. 2
FIG. 3
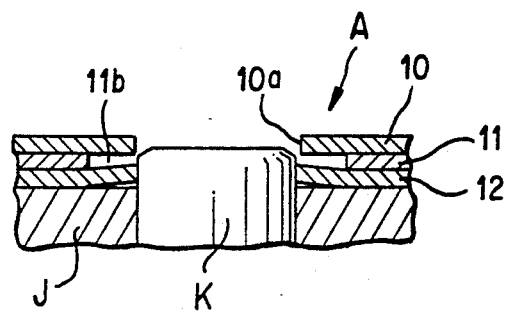
FIG. 4

STEEL LAMINATE GASKET WITH DOWEL ENGAGING DEVICE

BACKGROUND OF THE INVENTION AND RELATED ART STATEMENT

The present invention relates to a steel laminate gasket for an internal combustion engine with a dowel engaging device, which can be securely attached to dowels on an engine block.

When engine parts are assembled with a gasket, a lower engine part is placed on a floor or a platform. Since the lower engine part is provided with dowels for setting a location of the gasket, the gasket is placed on the lower engine part so that the dowels are located in dowel holes of the gasket. Then, an upper engine part is placed above the gasket, and the two engine parts are tightened together by bolts.

In order to easily assemble the gasket on the lower engine part, the diameter or size of the dowel hole of the gasket is slightly larger than the diameter of the dowel. Therefore, in case the lower engine part with the gasket is shaken, the gasket may disengage from the lower engine part.

Especially, in a V engine, gasket attaching surfaces of the lower engine part inclines downwardly. Therefore, even if gaskets are installed on the gasket attaching surfaces of the lower engine part, the gaskets are liable to disengage from the lower engine part.

In an automatic assembly line of engines, engines are continuously or consecutively moved. When the upper engine part is assembled on the lower engine part with the gasket, in some cases, the engine parts are stopped for a while for assembly.

In the V engine, in case the lower engine part with the gasket is consecutively moved and stopped, the gasket may fall from the lower engine part. In the automatic assembly line, it is troublesome to check the gasket in each engine, and install a gasket in case no gasket is placed on the lower engine part.

In a gasket, there has not been made any device for preventing the gasket from disengaging from an engine part.

Accordingly, one object of the present invention is to provide a steel laminate gasket having a dowel engaging device to prevent the gasket from accidentally disengaging from the engine part.

Another object of the invention is to provide a steel laminate gasket as stated above, which can be easily installed on the engine without affecting thereto.

A further object of the invention is to provide a steel laminate gasket as stated above, which can be easily and economically manufactured.

Further objects and advantages of the invention will be apparent from the following description of the invention.

SUMMARY OF THE INVENTION

In accordance with the present invention, the steel laminate gasket is installed between two engine parts. One of the engine parts is provided with at least two positioning pins or dowels for setting a location of the gasket.

The gasket basically comprises a first plate and a second plate situated above the first plate. The first plate includes at least first and second holes formed at portions corresponding to the positioning pins on the engine part, and at least two slits to form a flap therebetween. The diameter of the first hole is substantially the same as the diameter of the positioning pin. The flap is located adjacent to the first hole to slightly project inside the first hole.

When the first hole is aligned with the positioning pin and the first plate is urged or pushed against the engine part with the positioning pins, the flap deforms or bends. Accordingly, the positioning pin can enter into the first hole and engage together to thereby prevent the first plate to easily disengage from the engine part.

The second plate is provided with third and fourth holes at portions corresponding to the first and second holes respectively, and at least notch provided adjacent to the third hole. The third hole has diameter equal to or larger that of the first hole. The notch has a size larger than the flap, and is situated above the flap when the first and second plates are assembled together. Therefore, in case the flap is bent toward the second plate when the positioning pin is inserted into the first hole, the flap is located in the notch and does not affect the second plate.

The first and second plates are connected together in a conventional method, such as welding or grommet partly covering the first and second plates. Therefore, the gasket, i.e. first and second plates, does not disengage from the engine block when installed. In the gasket of the invention, other plates may be installed under the first plate or above the second plate to form a steel laminate gasket with three or more plates.

Each slit of the first plate may have a predetermined width. Also, the flap may be bent in advance so that the diameter of the first hole does not exceed the diameter of the positioning pin. The gasket can be easily engaged with the positioning pins when installed.

The second and fourth holes and their vicinities may be formed as in the first and third holes and their vicinities respectively so that the two positioning pins engage the gasket.

BRIEF DESCRIPTION OF THE DRAWINGS

FIG. 1 is a plan view of a part of a gasket of the preset invention;

FIG. 2 is an enlarged plan view of a part of the gasket for showing middle and lower plates;

FIG. 3 is a partially cut perspective view for showing the gasket of the invention; and FIG. 4 is an enlarged section view taken along line 4—4 in FIG. 1, wherein the gasket is installed on a cylinder block.

DETAILED DESCRIPTION OF PREFERRED EMBODIMENT

Referring to FIGS. 1–4, a steel laminate gasket A of the invention is shown. The gasket A is a cylinder head gasket and is provided with a plurality of cylinder bores Hc, water holes Hw, oil holes Ho, bolt holes Hb, positioning pin or dowel holes Hd, and push rod holes Hp, as in the conventional gasket. Since the present invention is directed to the structure of the dowel holes Hd, other structure and sealing mechanisms are not explained. Any structure and sealing mechanisms may be used.

As shown in FIG. 4, the gasket A of the invention is designed to be installed on a cylinder block J with a dowel K. The dowel slightly projects upwardly from an upper surface of the cylinder block J.

The gasket A comprises an upper plate 10, a middle plate 11, and a lower plate 12. The upper plate 10 extends substantially the entire area of the gasket A and includes a hole 10a having a diameter equal to or slightly larger than the diameter of the dowel K.

The middle plate 11 is situated under the upper plate 10. The middle plate 11 includes a hole 11a having a diameter equal to or slightly larger than that of the dowel K, and two notches 11b facing against each other.

The lower plate 12 is situated under the middle plate 11 and extends substantially the entire area of the gasket. The lower plate 12 includes a hole 12a having a diameter equal to or slightly larger than that of the dowel K, and two flaps 12b facing against each other. Each flap 12b is surrounded by two slits or grooves 12c, and slightly projects into the hole 12a.

The notch 11b of the middle plate 11 is slightly larger than the flap 12b. When the middle and lower plates 11, 12 are assembled, the flaps 12b are located under the notches 11b.

When the plates 10, 11, 12 are assembled together, the plates 10, 11, 12 are connected together by spot welding (not shown). In case a grommet or a cover member for holding the upper and lower plates is used, the plates need not be connected by spot welding.

When the gasket A is installed on the cylinder block J, the gasket A is placed above the cylinder block J so that the dowels K align the holes 12a. Then, the gasket A is strongly pushed against the cylinder block J. As a result, the flaps 12b bend to allow the dowels K to enter into the holes 12a, 11a, 10a.

Since the middle plate 11 has the notches 11b larger than the flaps 12b, when the flaps 12b deform or bend, the flaps 12b are pushed to partly locate inside the notches 11b. The deformation of the flaps 12b does not affect the other plates.

When the dowels K enter into the holes 12a, edges of the flaps 12b engage the dowels K. Therefore, the gasket A does not disengage from the cylinder block J.

In the steel laminate gasket of the present invention, one of the plates is provide with a hole corresponding to the dowel and at least two flaps slightly projecting into the hole, and the other plate is provided with a hole corresponding to the dowel and at least two notches located above the flaps. When the gasket is pushed over the dowel, the flaps bend to securely engage the gasket to the engine block. Therefore, even if the engine block is transferred in an assembly line, the gasket does not accidentally disengage from the engine block.

While the invention has been explained with reference to the specific embodiment of the invention, the explanation is illustrative, and the invention is limited only by the appended claims.

What is claimed is:

1. A steel laminate gasket adapted to be installed between two engine parts, one of the engine parts having at least two positioning pins with predetermined diameter, said positioning pins setting a location of the gasket, comprising, a first plate having at least first and second holes formed at portions corresponding to the positioning pins on the engine part, said first hole having a diameter substantially the same as the predetermined diameter of the positioning pin, and at least two slits adjacent the first hole to form a flap therebetween, said flap being located adjacent to the first hole to project inside the first hole so that when the first hole is aligned with the positioning pin and the first plate is urged against the engine part with the positioning pin, the flap deforms to allow the positioning pin to enter into the first hole to thereby prevent the first plate to easily disengage from the engine part, and a second plate situated above and connected to the first plate, said second plate having third and fourth holes at portions corresponding to the first and second holes respectively, said third hole having a diameter substantially the same as that of the first hole in minimum, and at least one notch provided adjacent to the third hole and having a size larger than the flap and being situated above the flap when the first and second plates are assembled together so that in case the flap is bent toward the second plate when the positioning pin is inserted into the first hole, the flap is located in the notch not to affect the second plate.

2. A steel laminate gasket according to claim 1, wherein each slit has a predetermined width so that the flap between the slits can move without affecting to adjacent portions.

3. A steel laminate gasket according to claim 1, wherein a plurality of flaps and notches are formed around the first and third holes symmetrical to an axis of the first and third holes.

4. A steel laminate gasket according to claim 1, wherein said second hole has a diameter substantially the same as the predetermined diameter of the positioning pin, said first plate further including two slits adjacent the second hole to form a flap therebetween, said flap adjacent the second hole projecting inside the second hole as in the flap adjacent the first hole, said fourth hole having a diameter larger than the second hole, and said second plate further including a notch adjacent the fourth hole having a size larger than the flap adjacent the second hole.

* * * * *